United States Patent [19]
Horvath

[11] 3,869,912
[45] Mar. 11, 1975

[54] METHOD AND APPARATUS FOR DETERMINING TRANSFORMATION TEMPERATURES

[75] Inventor: James Horvath, Amherst, Ohio
[73] Assignee: The B. F. Goodrich Company, New York, N.Y.
[22] Filed: Mar. 8, 1974
[21] Appl. No.: 449,525

[52] U.S. Cl. ............... 73/150 R, 73/15 R, 165/61, 165/168
[51] Int. Cl. ......................................... G01h 25/02
[58] Field of Search ............... 73/15 R, 17 A, 150 R; 165/30, 61, 64, 168

[56] References Cited
UNITED STATES PATENTS
2,464,546  3/1949  Albright ................................. 73/17
3,801,467  4/1974  Nobe et al. ............................ 73/15

Primary Examiner—Herbert Goldstein
Attorney, Agent, or Firm—W. A. Shira, Jr.

[57] ABSTRACT

A method and apparatus for determining the temperature at which a transformation occurs in a castable material such as a latex emulsion, a plastisol, etc. The apparatus includes a thermally conductive test block including an elongated test surface thereon having a temperature gradient thereacross. Heat is applied to the test block at a plurality of spaced points therealong, and heat is removed from a plurality of points disposed between the heat input points. Means are provided to selectively control the amount of heat supplied to and the amount of heat removed from each of the various zones along the length of the test block. Temperature measuring means such as thermocouples are placed in the test block along the length of the test surface to ascertain the temperature therealong where a physical transformation occurs. The physical transformation may or may not be visible to the operator.

11 Claims, 4 Drawing Figures

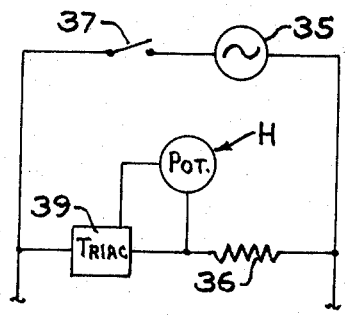
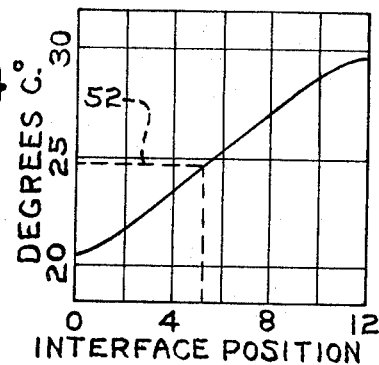
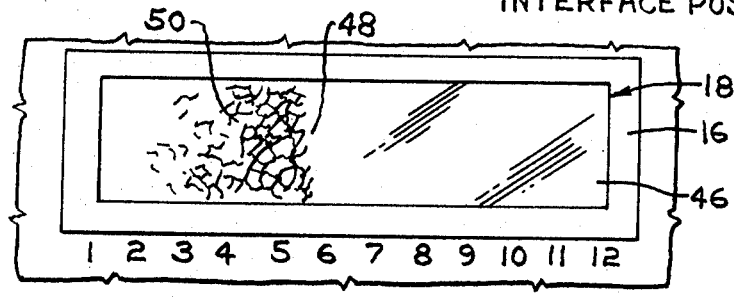
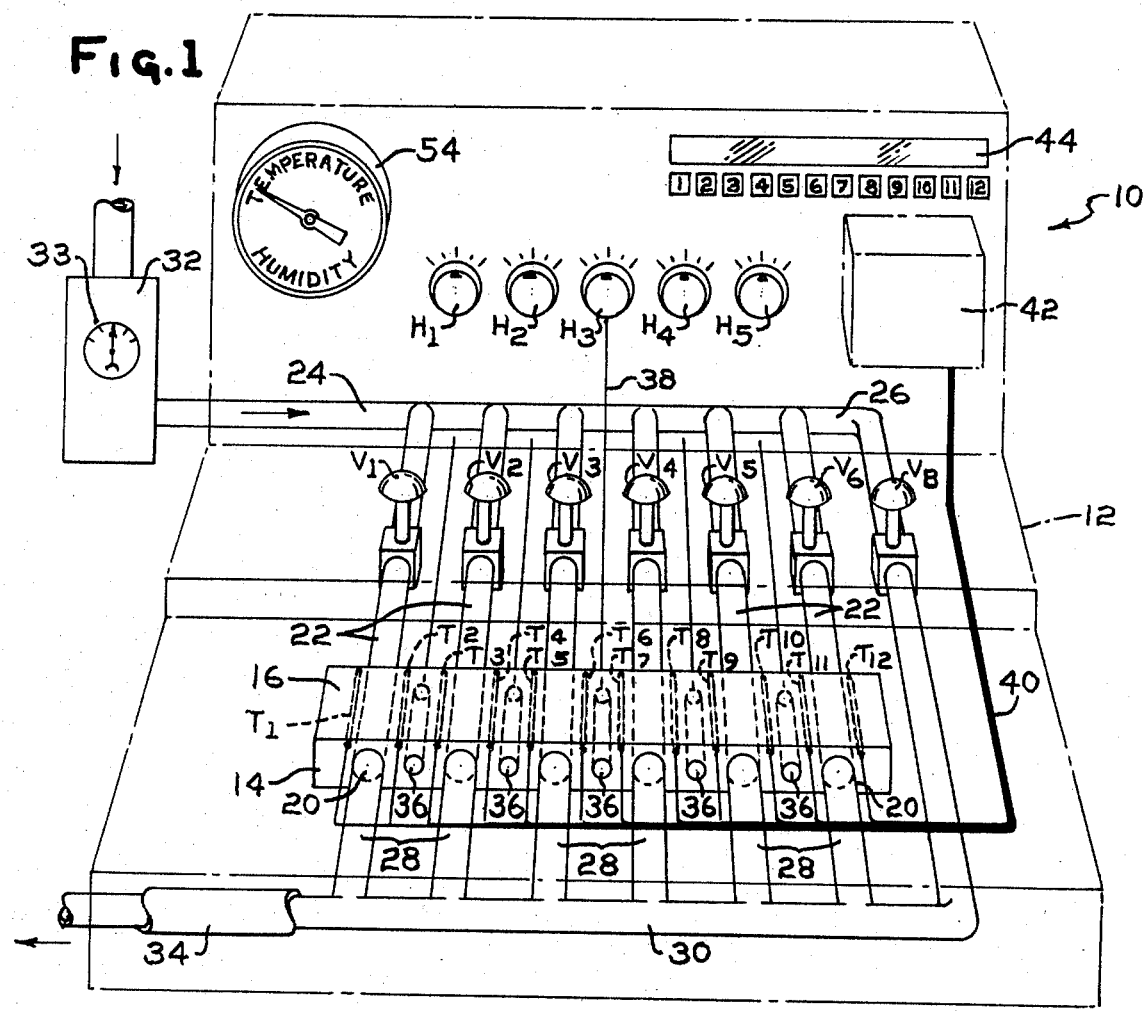

METHOD AND APPARATUS FOR DETERMINING TRANSFORMATION TEMPERATURES

BACKGROUND OF THE INVENTION

This invention relates to an apparatus and a method for determining the minimum temperature at which certain physical transformations occur in materials capable of being applied in a relatively thin layer to a test surface. Exemplary of the physical transformation temperatures which may be determined in temperature responsive materials are minimum film-forming temperatures of latex emulsions, or gel-temperatures and fusion temperatures of plastisols. In all coating applications it is extremely important to know the temperature at which a continuous film will be formed; as distinguished from the temperature below which the liquid carrier or solvent will merely evaporate and leave discontinuous, opaque, cracked, non-adherent deposits. It will be recognized that the formation of a film will provide a bond to the substrate whereas the mere removal of the liquid vehicle or solvent leaves a deposit of particulate material which is easily removed from the substrate. As a practical example, outdoor latex paints represent a typical application where it is important to the user to know the minimum film-forming temperature so that the paint would not be applied below that temperature. While the above example represents a latex and water emulsion, similar problems prevail in connection with the use of plastisols, organisols, etc., as well as the numerous other coating systems, wherein a necessary physical transformation occurs above a particular temperature and does not occur below that temperature. In the case of a latex emulsion, the liquid vehicle is merely removed or evaporated to leave nonadherent deposits of solids or particulate constituents. In the case of plastisols, if the material has not reached at least the gelling temperature, it will remain as a tacky mass; and unless the fusion temperature is reached, a strong, elastic adherent coating will not be produced. At temperatures between the gellation temperature and fusion point, the plastisol will produce a non-tacky but non-adherent coating of low strength which will crumble and degrade easily. It is also important to know in thermoset type systems, whether deposited from solvent or water, at what temperature cure occurs. This can be done by depositing a film on a plate and putting this plate on the apparatus. When the film is rubbed with a solvent affecting the uncured portion and not affecting the cured portion, a distinct line occurs showing at what temperature cure was produced.

Heretofore, a typical method of determining minimum physical transformation temperatures involved casting the material onto a plate and placing the plate in a hot oven at a given temperature for a prescribed period of time. The plate was then inspected to see whether or not a film had formed, or other transformation had occurred. If the test was negative, the process was repeated at a higher temperature. If the test was positive, the process was also repeated but at a lower temperature. This trial and error procedure is followed until an approximate transformation is found.

It will be apprectiated that the time and expense involved in such a procedure is considerable and that the accuracy and reproducability is limited.

Another method of determining minimum film formation temperature is represented by the test procedure outlined in the bulletin ASTM D2354-68. This ASTM method essentially amounts to providing a horizontal thermally conductive table with one end thereof in contact with the coolant and the other end thereof at ambient temperature, or in contact with a source of heat. The material to be tested is cast upon the heat conductive table. The temperature of the table is noted where the formation of a film is observed. While this basic technique is a considerable improvement over the aforementioned trial and error method, its flexibility and reproducability is extremely limited because there is little or no positive control over the actual temperature gradient across the length of the table. Normally, the low temperature end of the table is attained by immersing it in an isopropanol-dry ice bath. Accordingly, it is necessary to adjust the height of the dry ice-isopropanol bath in order to vary the temperature gradient across the table. Similar comments follow with respect to the high temperature end of the table.

Applicant's invention is useful in connection with the formulation or compounding of materials as well as quality control of products and analytical determinations.

SUMMARY OF THE INVENTION

This invention provides a highly flexible, positively controlled apparatus and method for determining the minimum physical transformation temperature of temperature responsive or temperature sensitive materials.

An elongated heat conductive test block is provided having a plurality of passages therein through which a cooling medium may circulate. The temperature of the coolant and the rate of flow through each passage is positively controlled. Interposed between the coolant circulating passages, there is provided a plurality of heating means. The heat input by each heating means is also positively controlled. Accordingly, the heat conductive test block is provided with a plurality of heating means and a plurality of cooling means, each of which is independently and individually variable, thereby permitting the user to establish a selected temperature gradient across the test surface. The particular temperature gradient selected is dictated by the type of material to be tested. For example, latex emulsions may require a gradient of from 0° to 100° C and selected gradients therebetween, while a plastisol may require a gradient of from 75° to 350° C and selected gradients therebetween.

The heat conducting block, in proximity to the test surface, is provided with a plurality of temperature measuring elements such as thermocouples to determine the temperature at the particular point where a physical transformation is observed.

The material to be tested is cast or coated upon a heat conductive test plate which is then placed upon the test surface of the heat conducting block of applicant's testing device. The test plate and test surface of the block are placed in efficient thermal contact. The testing device is preferably equipped with a direct digital readout to indicate the temperature at the zone where the physical transformation occurs.

An object of this invention is to provide an apparatus and method for easily and quickly determining minimum physical transformation temperatures of materials over a wide range of temperatures.

Another object of this invention is to provide a method of positively controlling the temperature of a surface of a thermally conductive body.

Another object of this invention is to provide an apparatus having a test surface thereon which may be easily positively adjusted and controlled to provide a selected temperature gradient with a temperature differential thereacross ranging from 5° to 150° C.

DESCRIPTION OF THE DRAWINGS

FIG. 1 is a perspective view, with parts broken away, of one preferred embodiment of this invention.

FIG. 2 is a plan view of a typical test plate upon completion of a test for minimum film-forming temperature of a latex emulsion, showing the distinctness of the interface between the portion of the material which formed a film and the portion which did not form a film.

FIG. 3 is a diagram of a portion of the electrical circuit employed in the apparatus.

FIG. 4 shows the relationship between the position of the interface and the temperature at which a physical transformation occurs in a typical latex emulsion.

DESCRIPTION OF THE PREFERRED EMBODIMENTS

Referring now more particularly to the drawings, the apparatus of applicant's invention is generally indicated at 10 and is contained within an enclosure 12. Contained within cabinet or enclosure 12 is the test block 14, the upper surface 16 of which is exposed to provide a test surface for use in determining the minimum physical transformation temperature of a material.

Test block 14 is preferably an elongated, thermally conductive metal block made of a material such as aluminum, for example. Preferably, the block is of uniform width and thickness throughout its length. As is more clearly illustrated in FIG. 2, upper surface 16 of the test block 14 is essentially planar and faces upwardly to receive a test plate 18 upon which the material is coated for testing.

The test block 14 is provided with a plurality of through passages or bores 20 to which are connected a corresponding plurality of coolant supply lines 22.

The coolant supply lines 22 each lead from individual control valves denoted $V_1$, $V_2$, $V_3$, $V_4$, $V_5$ and $V_6$. Preferably, the control valves $V_1$ through $V_6$ are of the vernier type, so that the flow control may be precisely adjusted. The coolant source line 24 essentially amounts to a manifold which supplies each of the individual coolant supply lines 22 through valves $V_1$-$V_6$. Coolant source line 24 is provided with a by-pass line 26 in which line there is provided a valve $V_b$ indicating a by-pass valve. Valve $V_b$ is used to control the pressure in supply line 24.

Test block 14 is provided with a plurality of coolant discharge lines 28 corresponding in number to the coolant supply lines 22. Each coolant discharge line 28 enters a discharge manifold 30 which returns the discharge coolants to cooler 32. Cooler 32 removes the sensible heat which was imparted to the coolant fluid as it passed through the test block 14. Cooler 32 is provided with a coolant temperature adjustment means 33 so that the coolant may be discharged from the cooler and delivered to the test block at any desired temperature. Preferably, the cooling means 32 is capable of reducing the temperature of the coolant to −30° C. Through coolant temperature control means 33, bypass valve $V_b$ and the individual control valves $V_1$-$V_6$, the amount of heat removed from any particular zone along the length of test block 14 can be accurately controlled. Each coolant passage effectively serves as an individually controlled heat sink to dissipate the desired amount of thermal energy from each individual zone along the length of the test block 14 and test surface 16. Preferably, the coolant circulating lines are insulated as indicated at 34. While any suitable coolant may be used, it is preferred to use an ethylene glycol solution which may be reduced to −30° C without freezing.

In the embodiment illustrated the test block 14 is approximately 12 inches long with each coolant passage 20 being positioned approximately 2 inches apart. The end passages are spaced inwardly appoximately an inch from either extremity of the block. It will be understood that the actual dimensions of the test block 14 and test surface 16 are not critical. It will be understood that the test block may be of any desired length and that a greater temperature gradient is more easily attained with a longer block. A twelve-inch aluminum block having a thickness of about one inch is found to be suitable for a 120° C gradient. The same block may be used to provide a 5° C gradient to pinpoint a transformation temperature by making appropriate adjustments in the heating and cooling rates.

Disposed intermediate each coolant passage 20 is a heating means 36. While any suitable heating means may be used, it is preferred to use electrical resistance heaters. Each heater 36 is electrically interconnected by conventional means to a source of electric current. The controls for the resistance heaters, only one of which is illustrated as being connected at 38, include a corresponding number of heater control means indicated as $H_1$, $H_2$, $H_3$, $H_4$ and $H_5$ mounted on the face of enclosure 12. The adjustable control means $H_1$-$H_5$ are potentiometers.

Referring more particularly to FIG. 3, there is shown a circuit suitable for each of the heaters. In FIG. 3 the resistance heating means is denoted 36 and the heater control as H. While five heaters are employed in the embodiment of the apparatus illustrated in FIG. 1, only one circuit is shown in FIG. 3. The basic circuit includes an A-C source 35 and an on-off switch 37. A TRIAC 39 is placed in the heater circuit to control the amount of current to heater 36. A "TRIAC" is an A-C semi-conductor switch supplied by the General Electric Company. A 10 amp 120 VRMS, identified as Model S100C3 is found to be suitable. The semi-conductor switch 39 will "fire," or switch on, and pass current to the resistance heater 36 in accordance with the resistance offered by adjustable potentiometer H. It will be understood that if a potentiometer alone were used to control resistance heater 36, the resistance would change with temperature, and therefore the output of the heater would not be constant as desired but would change. In applicant's method and apparatus positive temperature control of the test surface over the length thereof is required, and therefore the A-C semi-conductor switch is used.

Each of the heaters 36 are independent of each other and are independently controlled by controls $H_1$-$H_5$. Controls $H_1$-$H_5$, while referred to herein as potentiometers as a term used in the art, are actually adjustable resistance elements such as rheostats.

Since each cooling zone in the test block and test surface is independently controlled through valves $D_1$-$D_6$, bypass valve $V_b$ and coolant temperature control 33, and since each heater is independently controlled through controls $H_1$–$H_5$, it will be appreciated that it is possible to establish an almost infinite number of different temperature gradients across test surface 16.

While it is preferred for purposes of convenience to use electrical heaters, it will be understood that applicant's device could be modified by substituting heated liquid for the electrical heaters much in the nature of the provision made for the circulating coolant. In such a case, it would be necessary to also provide the necessary conduits, manifolds, etc. as well as passages through the test block for the heating fluid.

Near the test surface 16 of the test block 14, there are provided a plurality of temperature sensing means, such as thermocouples $T_1$ through $T_{12}$. Each thermocouple is electrically interconnected through conductors, collectively indicated at 40, to a direct readout temperature indicating device 42. The temperature indicating device 42 displays the actual test surface temperatures on screen 44.

Referring more particularly to FIG. 2, it will be noted that test surface 16 is number indicia along the length thereof. In this embodiment, numbers 1–12 are employed. Referring to FIG. 1, it is noted that the apparatus includes 12 manually and selectively operable switches numbered 1–12, corresponding to the positions on test surface 16 being numbered 1–12, and electrically interconnected through appropriate circuitry to the thermocouples $T_1$ to $T_{12}$. Thermocouple $T_1$, being situated at position no. 1 on test surface 16 as indicated in FIG. 2, is electrically interconnected with switch no. 1. By depressing switch no. 1, the actual temperature on surface 16 at position no. 1 is visually displayed at screen 44.

In using the method and apparatus of this invention, the operator would cast, or apply by any means suitable, a coating of the material to be tested on a test plate 18. Test plate 18 is made of a thermally conductive material, such as stainless steel, and is essentially planar so that it will provide complete contact with test surface 16.

In the event the operator does not have a general indication of the minimum transformation temperature of the test sample, the various controls, including coolant temperature 33, valves $V_1$ to $V_6$ and $V_b$, and heaters $H_1$ to $H_5$, would be adjusted to provide a large temperature gradient across the length of test surface 16. It will understood that a large temperature differential across the test surface does not permit the accuracy of a small differential over the same length of surface. Presuming for purposes of illustration, that the initial test indicated the minimum film-forming temperature of a latex emulsion was between 0° and 30° C, the numerous controls would be adjusted to provide a smaller temperature gradient across the same length of test plate 16. The apparatus would then be allowed to come to equilibrium, and the test procedure described supra would be repeated.

Referring again to FIG. 2, there is illustrated a test plate 18 upon which has been applied a coating of film-forming material 46. The sample formed a film at the temperatures prevailing between zones 6 and 12 of the test surface. The temperature at position 6 was above the minimum physical transformation temperature, and the temperature at position 5 was below. Accordingly, between positions 5 and 6 and an interface 48 would become visible, indicating that a temperature had been reached below which an adherent film would not form; but where the material would merely leave a non-adherent, chalky, particulate deposit 50 on the test plate 18. In practice, the interface 48 is usually very apparent and distinct to the observer. However, if the material is a highly pigmented plastisol, the operator may have to conduct a post-test examination of the specimen to determine where on the plate a high-tensile strength adherent film was formed to establish the minimum fusion temperature. In the latter case the line of demarcation is quite distinct and easily discernable.

The dotted line indicated at 52 in FIG. 4 graphically illustrates the condition shown in FIG. 2, indicating that the minimum physical transformation temperature is slightly less than 25° C because the interface resided at approximately midway between positions 5 and 6. The direct readout indicator 42 is provided with appropriate circuitry so that when two adjacent switches, 5 and 6 for example, are simultaneously depressed, the average temperature therebetween will be displayed at 44.

The apparatus is also provided with a hygrometer and thermometer assembly 54. While this assembly forms no necessary part of this invention, the ambient temperature and humidity may influence the results with certain materials and therefore these conditions are noted by the operator.

Various modifications are contemplated and may obviously be resorted to by those skilled in the art without departing from the described invention as only a preferred embodiment has been disclosed.

I claim:

1. An apparatus for determining the temperature at which a physical transformation occurs in a material comprising:
   an elongated thermally conductive test block including an essentially planar test surface thereon adapted to transfer heat to a coating of said material in thermal contact therewith,
   a plurality of essentially equally spaced passages through the test block disposed along the length thereof for passage of a coolant fluid therethrough to thereby remove heat from the test surface,
   means for circulating a coolant fluid through each of said plurality of passages,
   means to continuously remove heat from the coolant fluid, means for independently controlling the amount of heat removed by the coolant fluid circulating in each passage, a plurality of heating means in the test block positioned along the length thereof between the said plurality of coolant fluid passages, thereby to provide alternately disposed heating and cooling means along the length of the test block,
   means to independently control the amount of heat applied to the test block by each of said heating means,
   a plurality of means to measure the temperature of the test surface at numerous points along the length thereof.

2. The apparatus of claim 1 wherein the means for independently controlling the amount of heat removed by the coolant fluid comprises flow control means interconnected with each passage.

3. The apparatus of claim 1 further including means for controlling the temperature of the cooling fluid.

4. The apparatus of claim 3 wherein the means for independently controlling the amount of heat removed by the coolant fluid comprises flow control means interconnected with each passage.

5. The apparatus of claim 1 further including means to control the total amount of coolant fluid passing through all of the passages of the test plate.

6. The apparatus of claim 1 wherein said heating means are electrical.

7. The apparatus of claim 5 further including means to control the temperature of the cooling fluid.

8. The apparatus of claim 6 wherein the electrical heating means is controlled by an adjustable rheostat connected thereto in parallel with an A-C semiconductor switch.

9. An elongated surface having a controlled temperature differential thereacross comprising:
   a solid body of thermally conductive material having an elongated essentially planar upper surface thereon intersecting two essentially paralled side surfaces,
   a plurality of coolant passages extending through the solid body from one side surface thereof to the other and being essentially equally spaced along the length thereof,
   means for selectively and controllably circulating a coolant fluid through each of said passages,
   means for selectively and controllably heating said body at those portions thereof disposed between said coolant passages.

10. A method of providing a controlled temperature gradient on an essentially planar surface of an elongated heat conductive body comprising the steps of:
   1. continuously removing a controlled amount of heat from each of a first plurality of zones along the length of said body,
   2. simultaneously continuously supplying a controlled amount of heat to each of a second plurality of zones disposed alternately with respect to said first plurality of zones along the length of said body.

11. A method of providing a controlled temperature gradient on the surface of an elongated heat conductive body having essentially coplanar upper and lower surfaces and coplanar sides comprising the steps of:
   1. continuously circulating a coolant fluid through a plurality of passages extending through the body from one side thereof to the other and being equally spaced along the length of the body,
   2. controlling the rate of flow of coolant through each of said passages,
   3. continuously supplying heat to a plurality of individual heat input zones interposed between said coolant passages,
   4. controlling the rate of heat input to each of said individual zones, thereby to continuously supply heat to a plurality of spaced zones and to simultaneously continuously remove heat from a plurality of spaced zones along the length of said body.

* * * * *